(12) United States Patent
Suita et al.

(10) Patent No.: US 6,334,993 B1
(45) Date of Patent: Jan. 1, 2002

(54) LITHIUM MANGANATE, METHOD OF PRODUCING THE SAME, AND LITHIUM CELL PRODUCED BY THE METHOD

(75) Inventors: Tokuo Suita; Hiromitsu Miyazaki, both of Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

(21) Appl. No.: 09/367,285

(22) PCT Filed: Dec. 22, 1998

(86) PCT No.: PCT/JP98/05798

§ 371 Date: Aug. 16, 1999

§ 102(e) Date: Aug. 16, 1999

(87) PCT Pub. No.: WO99/33128

PCT Pub. Date: Jul. 1, 1999

(30) Foreign Application Priority Data

Dec. 22, 1997 (JP) .............................................. 9-365563

(51) Int. Cl.[7] ........................ C01D 15/00; C01G 45/00; H01M 4/50
(52) U.S. Cl. ........................................ 423/599; 429/224
(58) Field of Search ........................... 423/599; 429/224

(56) References Cited

U.S. PATENT DOCUMENTS 5,702,679 A * 12/1997 Sheargold et al. .......... 423/599
5,742,070 A *  4/1998 Hayashi et al. ............. 423/605
5,807,646 A *  9/1998 Iwata et al. ................. 423/599
5,879,654 A     3/1999 van Ghemen et al.

FOREIGN PATENT DOCUMENTS

| JP | 07-101728 | 4/1995 |
| JP | 08-69790  | 3/1996 |
| JP | 08-277118 | 10/1996 |
| JP | 09-86933  | 3/1997 |
| JP | 09-180723 | 7/1997 |
| JP | 10-003921 | 1/1998 |
| JP | 10-308218 | 11/1998 |

OTHER PUBLICATIONS

Yoshio et al., "Preparation of Cathode Materials for Lithium Batteries by Melt Impregnation Method I. Preparation of Spinel LiMn,O", Electrochemistry, 1995, 63, No. 10/941, pp. 51–56, no month.

* cited by examiner

Primary Examiner—Steven Bos
(74) Attorney, Agent, or Firm—Manelli Denison & Selter PLLC; Paul E. White, Jr.

(57) ABSTRACT

The present invention relates to a lithium manganate useful as an active material of positive electrodes for lithium batteries, and a process for producing the same, a positive electrode which uses the same as an active material of positive electrode, and a lithium battery. The lithium manganate of the present invention has a cubic particle form and contains voids in the particles, and therefore lithium batteries using it as an active material of positive electrodes provides a high initial discharge capacity of at least 95 mAh/g and, besides, are excellent in cycle characteristics.

14 Claims, 7 Drawing Sheets

LITHIUM MANGANATE, METHOD OF PRODUCING THE SAME, AND LITHIUM CELL PRODUCED BY THE METHOD

TECHNICAL FIELD

The present invention relates to lithium manganate which is a compound useful as an active material for positive electrode for lithium battery, a process for producing the same, a positive electrode for lithium battery using the same as an active material for positive electrode, and a lithium battery.

BACKGROUND ART

Lithium manganate is a compound represented by the formula $Li_xMn_yO_4$, and representative are spinel type $LiMn_2O_4$, $Li_{4/3}Mn_{5/3}O_4$ and the like. For obtaining such lithium manganates, a process of firing a mixture of a manganese compound and a lithium compound at a temperature of about 800° C. is employed.

DISCLOSURE OF INVENTION

Lithium manganate obtained by the above conventional process is apt to become a sintered body in which non-uniform sintering occurs between particles because a mixture of a manganese compound and a lithium compound is fired at about 800° C. for the purpose of adjustment of valence of manganese or diminishment of by-products. Thus, there is a problem that size of particles cannot be controlled. Moreover, since a mixture of a manganese compound and a lithium compound is inferior in reactivity even when it is fired at high temperatures, uniform composition can hardly be obtained and there are many lattice defects. In order to avoid these problems, firing or mechanical grinding must be repeated many times.

Furthermore, lithium secondary batteries which use lithium manganate obtained by the above process as an active material for positive electrodes are not only low in initial charge and discharge capacity, but also show conspicuous reduction in capacity with repetition of charge and discharge. This is because crystals of lithium manganate are collapsed at the time of charging and discharging, which is considered to be caused by the presence of lattice defects and the low lithium ion conductivity.

For the solution of the above problems, there is proposed a process which comprises impregnating a porous manganese dioxide with lithium acetate, lithium nitrate or lithium hydroxide and obtaining a product of uniform composition at low temperatures (for example, "Electro-chemistry (Denki Kagaku)", 63, 941 (1995)), but this process is still not sufficient.

The inventors have conducted intensive research in an attempt to obtain lithium manganate useful as active materials for positive electrodes of lithium batteries. As a result, it has been found that lithium secondary batteries in which is used an active material for positive electrodes which comprises lithium manganate having a cubic particle form and containing voids in the particles are high in initial charge and discharge capacity and excellent in cycle characteristics after repetition of charge and discharge. After additional investigations, the present invention has been accomplished. That is, the present invention relates to a lithium manganate which has a cubic particle form and provides an initial discharge capacity of at least 95 mAh/g when it is used as an active material for positive electrodes of lithium batteries. Furthermore, the present invention relates to a process for the advantageous production of the lithium manganate, and the first process is characterized by including a step of reacting a manganese compound with an alkali to obtain a manganese hydroxide, a step of oxidizing the hydroxide in an aqueous medium or a gaseous phase to obtain a manganese oxide, a step of reacting the manganese oxide with a lithium compound in an aqueous medium to obtain a lithium manganate precursor, and a step of firing the precursor with heating to obtain lithium manganate. The second process is characterized by including a step of reacting a manganese compound with an alkali to obtain a manganese hydroxide, a step of oxidizing the hydroxide in an aqueous medium or a gaseous phase to obtain a manganese oxide, a step of reacting the manganese oxide with an acid in an aqueous medium to substitute proton for a part of manganese to obtain a proton-substituted manganese oxide, a step of reacting the proton-substituted manganese oxide with a lithium compound in an aqueous medium to obtain a lithium manganate precursor, and a step of firing the precursor with heating to obtain lithium manganate. The present invention further relates to a positive electrode for lithium battery in which the above lithium manganate is used as an active material for the positive electrode and to a lithium battery using the positive electrode.

BRIEF DESCRIPTION OF DRAWINGS

FIG. 1 is an X-ray diffraction chart of sample a.

BEST MODE FOR CARRYING OUT THE INVENTION

Figure 1:
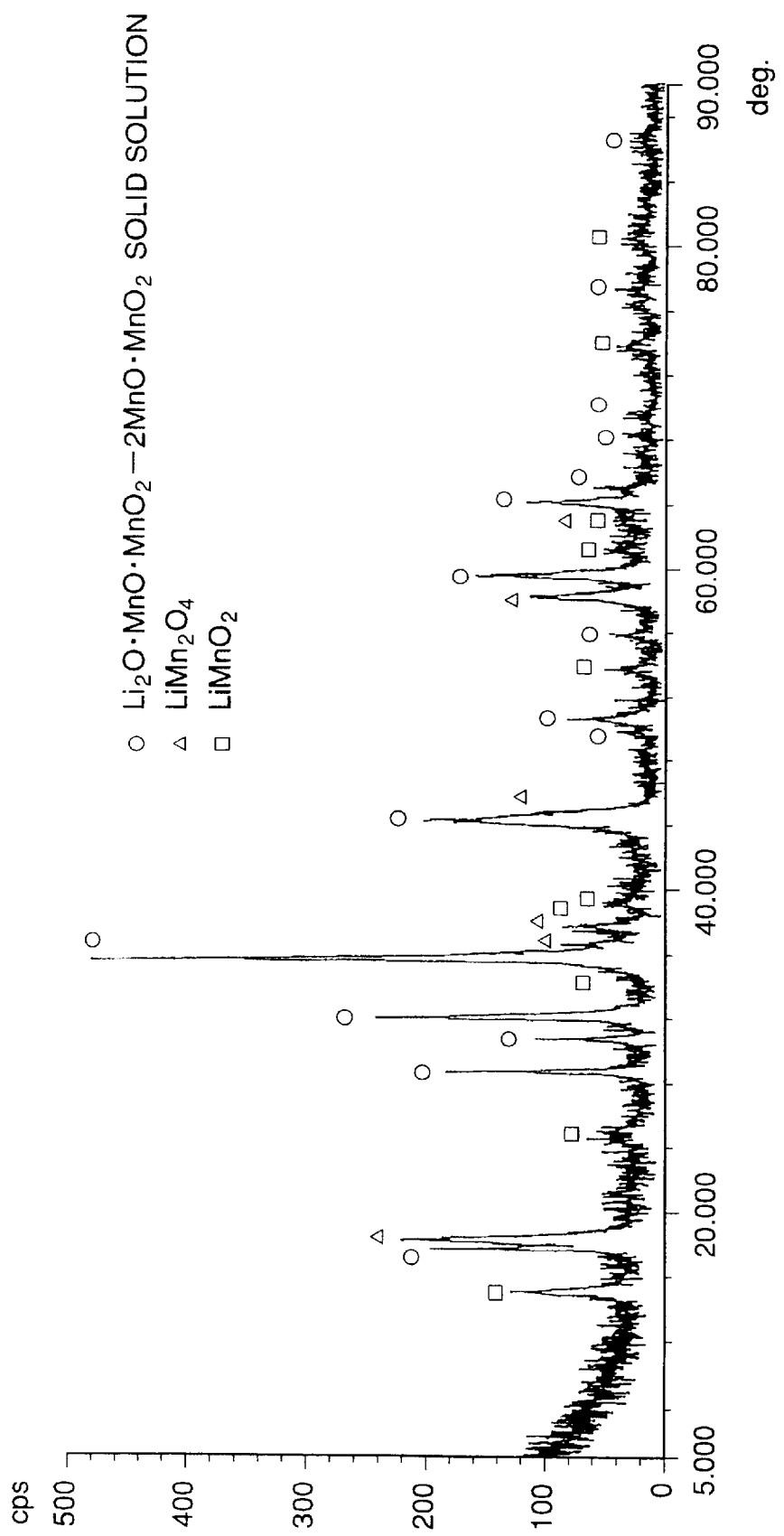

The present invention relates to a lithium manganate which has a cubic particle form and contains voids in the particles and provides an initial discharge capacity of at least 95 mAh/g, preferably at least 100 mAh/g when it is used as an active material for positive electrodes of lithium batteries. The lithium manganate may be a single phase or may be a mixture containing lithium manganate and impurities coming from the production steps, such as manganese oxide, as far as the above-mentioned discharge capacity is at least 95 mAh/g. If the discharge capacity is lower than the above range, amount of lithium manganate necessary for obtaining batteries of desired capacity increases and this is industrially not preferred. Lithium manganate in the present invention is a compound represented by the formula $Li_xMn_yO_4$, and the values of x and y in the formula are preferably in the range of 0.3–1.5 expressed by the value of x/y. As preferred compositions, mention may be made of, for example, spinel type $LiMn_2O_4$ and $Li_{4/3}Mn_{5/3}O_4$ and layered rock-salt type $LiMnO_2$.

The cubic particle form means cubic form such as a die or rectangular parallelopiped form, and the particles include those having angles, namely, apexes or sides which are partially removed. All of the individual particles are not needed to have the same form, and as far as they are mainly composed of cubic particles, amorphous particles may partially be contained.

The presence of voids in the particles can be confirmed by measuring void content, and when the void content is 0.005 ml/g or more, it can be admitted that the particles have voids. The void content is preferably 0.01–1.5 ml/g and more preferably 0.01–0.7 ml/g.

Furthermore, that the initial discharge capacity is at least 95 mAh/g when the lithium manganate is used as an active material for positive electrodes of lithium batteries can be easily confirmed by conducting the measurement in the state of battery and under the measuring conditions mentioned hereinafter.

By employing the above construction, the lithium secondary batteries which contain the lithium manganate of the present invention as an active material of positive electrodes are high in initial charge and discharge capacity and excellent in cycle characteristics.

Specific surface area of the lithium manganate is preferably 1–100 $m^2/g$, more preferably 1–30 $m^2/g$. Since this range is preferred for insertion reaction of lithium, when the lithium manganate is used for positive electrodes of lithium batteries, no collapse of crystals occurs at the time of charging and discharging, and battery characteristics are excellent. The particle diameter is preferably 0.01–10 $\mu$m, more preferably 0.05–5 $\mu$m. The particle diameter can be measured by reading the maximum length of the individual particles in an electron microphotograph.

With regard to the process for producing lithium manganate according to the present invention, the first production process is characterized by including ① a step of reacting a manganese compound with an alkali to obtain a manganese hydroxide, ② a step of oxidizing the hydroxide in an aqueous medium or a gaseous phase to obtain a manganese oxide, ③ a step of reacting the manganese oxide with a lithium compound in water to obtain a lithium manganate precursor, and ④ a step of firing the precursor with heating to obtain a lithium manganate. The second production process is characterized by including ① a step of reacting a manganese compound with an alkali to obtain a manganese hydroxide, ② a step of oxidizing the hydroxide in an aqueous medium or a gaseous phase to obtain a manganese oxide, ②' a step of reacting the manganese oxide with an acid in an aqueous medium to substitute proton for a part of manganese to obtain a proton-substituted manganese oxide, ③ a step of reacting the proton-substituted manganese oxide with a lithium compound in an aqueous medium to obtain a lithium manganate precursor, and ④ a step of firing the precursor with heating to obtain a lithium manganate.

The step ① is a step of reacting a manganese compound with an alkali to obtain a manganese hydroxide. The reaction of a manganese compound with an alkali can be carried out by reacting a water-soluble manganese compound with an alkali in an aqueous medium or by reacting a manganese solution containing $Mn^{2+}$, $Mn^{3+}$ and/or $Mn^{4+}$ ion obtained by dissolving a hardly water-soluble manganese compound in an acid with an alkali in an aqueous medium. The former process of reacting a water-soluble manganese compound with an alkali in an aqueous medium is more preferred. As the water-soluble manganese compounds, there may be used water-soluble inorganic manganese compounds such as manganese sulfate, manganese chloride and manganese nitrate and water-soluble organic manganese compounds such as manganese acetate. As the hardly water-soluble manganese compounds, there may be used $MnO_2$ and hydrates thereof, $Mn_2O_3$ and hydrates thereof, manganese oxides such as MnO and $Mn_3O_4$, and organic manganese compounds such as manganese alkoxides. As the acids used, mention may be made of inorganic acids such as sulfuric acid, hydrochloric acid and nitric acid, and organic acids such as acetic acid and formic acid. As the alkalis, there may be used alkali hydroxides such as sodium hydroxide, potassium hydroxide and lithium hydroxide, ammonia compounds such as ammonia gas and aqueous ammonia, and alkali carbonate compounds such as sodium carbonate, potassium carbonate, lithium carbonate and ammonium carbonate. The reaction can be carried out in an atmosphere of either air or inert gas, but is preferably carried out in an inert gas atmosphere for the purpose of controlling the oxidation level of the manganese hydroxide. Reaction temperature is preferably 10–80° C. for controlling the particle form.

The resulting manganese hydroxide may be filtered or washed, if necessary.

The next step ② is a step of oxidizing the manganese hydroxide obtained in the step ① in an aqueous medium or a gaseous phase to obtain a manganese oxide. The oxidization in an aqueous medium can be carried out by blowing air, oxygen or ozone into an aqueous medium containing the manganese hydroxide or adding aqueous hydrogen peroxide or a peroxodisulfate to the aqueous medium. For example, potassium peroxodisulfate can be used as the peroxodisulfate. Oxidizing temperature in the aqueous medium is preferably 10° C. to boiling point, more preferably room temperature to 90° C. The oxidization in a gaseous phase can be carried out by filtering or washing the aqueous medium containing the manganese hydroxide, if necessary, and then drying the manganese hydroxide in the air. Oxidizing temperature in the gaseous phase is preferably room temperature to 300° C., more preferably 50–130° C. In the present invention, it is preferred that the manganese hydroxide obtained in the step ① is (i) oxidized in an aqueous medium or (ii) first partially oxidized in the aqueous medium and then oxidized in a gaseous phase. The degree of oxidation of the manganese hydroxide can be optionally set, but it is considered that when the oxidation degree is small, oxides, hydrated oxides or hydroxides of manganese of bivalence, trivalence and tetravalence are present in the manganese oxide. Manganese oxides of preferred state in the present invention comprise $2 MnO \cdot MnO_2$ as a main component with the molar ratio $Mn^{2+}/Mn^{4+}$ being in the range of 1–3. More preferred are manganese oxides which have a specific surface area of 10–40 $m^2/g$, a void content of 0.08–0.3 ml/g, and a particle diameter of about 0.08–0.15 $\mu$m, and these manganese oxides readily react with lithium compound in the next step ③ because of the large specific surface area and the high void content. Such manganese oxides having a large specific surface area and a high void content can be obtained by employing the above-mentioned preferred oxidizing conditions. In the step ①, while the manganese compound is reacted with the alkali, for example, while the alkali is added to an aqueous solution of a manganese compound, the oxidization may be carried out with air, oxygen, ozone, aqueous hydrogen peroxide, or peroxodisulfate.

The step ②' is a step of reacting the manganese oxide obtained in the step ② with an acid in an aqueous medium to obtain a proton-substituted manganese oxide resulting from substitution of proton for a part of manganese, and the proton-substituted manganese oxide is high in reactivity with the lithium compound in the subsequent step ③ of obtaining a lithium manganate precursor, and this is preferred.

As the acid, there may be used any of inorganic acids such as hydrochloric acid, sulfuric acid, nitric acid, hydrofluoric acid and the like, and water-soluble organic acids such as acetic acid, formic acid and the like. Among them, inorganic acids such as hydrochloric acid, sulfuric acid, nitric acid and hydrofluoric acid are preferred because these are industrially advantageous. The temperature at which the manganese oxide is reacted with acid is preferably in the range of room temperature to 90° C., more preferably in the range of 40–70° C.

The thus obtained manganese oxide may be filtered, washed or dried, if necessary.

The step ③ is a step of reacting the manganese oxide or the proton-substituted manganese oxide obtained in the step ② or ②' with a lithium compound in an aqueous medium to obtain a lithium manganate precursor. As the lithium compound, there may be used lithium hydroxide, lithium carbonate or the like, and lithium hydroxide is preferred because it is superior in reactivity. The reaction proceeds by mixing the lithium compound and the manganese oxide in an aqueous medium and keeping the temperature at 50° C. or higher. The temperature is more preferably 100° C. or higher, further preferably 100–250° C., and most preferably 100–180° C. When the reaction is carried out at a temperature of 100° C. or higher, it is preferred to put the lithium compound and the manganese oxide in an autoclave and subject them to hydrothermal treatment under saturated steam pressure or under pressurization. Furthermore, when the lithium compound and the manganese oxide are mixed in an aqueous medium and the mixture is heated, dried and solidified with evaporating the aqueous medium at 50° C. or higher (evaporation to dryness), concentration of the lithium compound in the aqueous medium increases with evaporation of the aqueous medium, and, as a result, the lithium manganate precursor is readily produced upon the reaction of the lithium compound and the manganese oxide, and this is preferred. The lithium manganate precursor obtained in the step ③ varies in composition depending on the reaction conditions, but is considered to be a mixture containing mainly a solid solution of $2MnO \cdot MnO_2$ and $Li_2O \cdot MnO \cdot MnO_2$, $LiMn_2O_4$, $LiMnO_2$ or the like. This can be confirmed by X-ray diffraction.

When the reaction in the step ③ is carried out with feeding an oxidizing agent by batch-wise or continuous process, reactivity with the lithium compound increases, and this is preferred. The batch-wise process is a process which comprises repeating the following operations (1)–(3) until the reaction reaches the desired level: (1) feeding a given amount of an oxidizing agent to the reaction system, then (2) carrying out the reaction with suspending the feeding of the oxidizing agent until the fed oxidizing agent has been consumed, and (3) measuring the reacting weights of the manganese compound and the lithium compound. The batch-wise process is preferred for accurately controlling the reacting weights of the manganese oxide and the lithium compound. The continuous process is a process of carrying out the reaction until it reaches the desired reaction level by continuously feeding the oxidizing agent to the reaction system with measuring the reaction level of the manganese oxide and the lithium compound. The continuous process is economically preferred for carrying out the reaction in industrial scale. Moreover, it is preferred to carry out the reaction using at least one oxidizing agent selected from air, oxygen, ozone, aqueous hydrogen peroxide and peroxodisulfate because the reactivity of the lithium compound and the manganese oxide is improved. As the peroxodisulfate, for example, potassium peroxodisulfate can be used.

In order to perform the step ③ by hydrothermal treatment and feeding the oxidizing agent by the batch-wise process, prior to the hydrothermal treatment, air, oxygen or ozone can be blown into the mixture of the lithium compound and the manganese oxide or aqueous hydrogen peroxide or peroxodisulfate can be added to the mixture and, further, oxygen can be fed. Furthermore, in the course of the hydrothermal treatment, the temperature is once lowered, and air, oxygen or ozone may be blown into the mixture of the lithium compound and the manganese oxide or aqueous hydrogen peroxide or peroxodisulfate may be added to the mixture and, further, oxygen may be fed. In the case of the continuous process, the hydrothermal treatment is carried out with continuously feeding oxygen gas under pressure. The reacting weights of the manganese oxide and the lithium compound can be obtained by taking a small amount of the reaction mixture and measuring by neutralization titration the alkali concentration of the solution from which solid matter has been removed.

The lithium manganate precursor obtained in the step ③ may further be oxidized by blowing air, oxygen or ozone into the solution containing the lithium manganate precursor or adding aqueous hydrogen peroxide or peroxodisulfate to the solution. Furthermore, if necessary, the solution may be filtered, washed or dried. The drying temperature can be optionally set within the range of lower than the temperature at which the lithium manganate precursor is converted to a lithium manganate, and is suitably 50–200° C.

The step ④ is a step of heating and firing the lithium manganate precursor obtained in the step ③ to obtain a lithium manganate. The temperature for heating and firing is in the range of from the temperature at which the precursor is converted to the lithium manganate to the temperature at which the specific surface area of the resulting lithium manganate reaches 1 $m^2/g$ or less. It is considered that the temperature for heating and firing may vary depending on the composition and particle size of the precursor and the firing atmosphere, but is generally 250–840° C., and is preferably 280–700° C. for obtaining fine lithium manganate of good crystallinity, and more preferably 300–600° C. Furthermore, a range of 650–800° C. is preferred for obtaining lithium manganate of large particle diameter. If the firing temperature is higher than the above range, lithium in the resulting lithium manganate readily vaporizes. The firing atmosphere is not limited as far as it is oxygen-containing atmosphere such as air, and the oxygen partial pressure can be optionally set.

Next, the present invention relates to a positive electrode for lithium batteries which uses the above-mentioned lithium manganate as an active material for the positive electrode, and further relates to a lithium battery made using this positive electrode. The lithium batteries in the present invention include primary batteries using lithium metal for negative electrodes, chargeable and dischargeable secondary batteries using lithium metal for negative electrodes, and chargeable and dischargeable lithium ion secondary batteries using a carbon material, a tin compound, lithium titanate and the like for negative electrodes.

In the case of coin-shaped batteries, the positive electrode for lithium batteries can be obtained by adding carbon conductive agents such as acetylene black, carbon and graphite powders and binders such as polytetrafluoroethylene resin and polyvinylidene fluoride to the lithium manganate powders of the present invention, kneading them, and molding the kneaded product into a pellet. In the case of cylindrical or rectangular batteries, the positive electrode can be obtained by adding the above additives and, besides, organic solvents such as N-methylpyrrolidone to the lithium manganate powders of the present invention, kneading them to prepare a paste, coating the paste on a metallic current collector such as an aluminum foil, and drying the coat.

As electrolytes of lithium battery, there may be used those which are prepared by dissolving lithium ion in a polar organic solvent which is neither oxidized nor reduced at a potential in a range wider than the electro-chemically stable range, namely, the potential range in which the battery works as a lithium battery. Examples of the polar organic solvent are propylene carbonate, ethylene carbonate, diethyl carbonate, dimethoxyethane, tetrahydrofuran, γ-butyrolactone, and mixtures thereof. As a solute for lithium ion source, there may be used lithium perchlorate, lithium hexafluorophosphate, lithium tetrafluoroborate, and the like. Furthermore, a porous polypropylene film or polyethylene film is put as a separator between electrodes.

As examples of the battery, mention may be made of coin-shaped battery made by disposing a separator between a pellet-like positive electrode and a negative electrode, press-bonding them to a sealed can with a propylene gasket, pouring an electrolyte therein, and sealing it, and a cylindrical battery made by coating a positive electrode material and a negative electrode material on metallic current collectors, rolling them with a separator therebetween, inserting them into a battery can with a gasket, pouring an electrolyte therein, and sealing the can. Moreover, there are three-electrode type batteries which are used especially for the measurement of electrochemical characteristics. These batteries in which a reference electrode is disposed in addition to a positive electrode and a negative electrode evaluate electrochemical characteristics of the respective electrodes by controlling the potential of the positive and negative electrodes in respect to the reference electrode.

The performance of the lithium manganate as a positive electrode material can be evaluated by constructing a lithium battery in the above-mentioned manner, charging and discharging the battery at a suitable potential and current, and measuring the electric capacity. Furthermore, cycle characteristics can be judged from the change in electric capacity caused by repetition of charge and discharge.

EXAMPLE

Examples of the present invention are shown below, but the present invention is never limited to these examples.

Example 1
(Synthesis of manganese hydroxide)

815 g of manganese sulfate (86% by weight as $MnSO_4$) was dissolved in water to prepare 6.179 liters of a solution. This aqueous manganese sulfate solution was charged in a glass reaction vessel of 10 liters, and, with stirring, 2.321 liters of sodium hydroxide of 4 mols/l in concentration was added to and dispersed in the aqueous solution over a period of 1 hour in a nitrogen atmosphere with keeping the temperature at 15±5° C. to obtain a manganese hydroxide.

(Synthesis of manganese oxide)

The resulting slurry containing manganese hydroxide was heated to 60° C., and air was blown thereinto for 1 hour to oxidize the manganese hydroxide in an aqueous medium, followed by aging for 1 hour with blowing nitrogen gas in place of the air and thereafter filtering and washing with water. The resulting filter cake was dried at 110° C. for 12 hours to carry out gas phase oxidation to obtain a manganese oxide. This manganese oxide was large in specific surface area and void content and was mainly composed of $2MnO \cdot MnO_2$.

(Synthesis of lithium manganate precursor)

The resulting manganese oxide (240 g in terms of Mn) was dispersed in water to prepare a slurry. Pure water and 0.920 liter of lithium hydroxide of 3.206 mols/l in concentration were added to the slurry to obtain 2.40 liters of a liquid. This was charged in a glass reaction vessel of 3 liters and heated to 80° C., and reaction was carried out for 3 hours with blowing air thereinto. The evaporated water was replenished and then a part of the slurry was taken and alkali concentration thereof was measured to find that 18.8% by weight of the added lithium reacted with the manganese oxide. The slurry was charged in an autoclave and subjected to hydrothermal treatment at 130° C. for 2 hours. The slurry was cooled to 80° C. and then alkali concentration in the slurry was measured in the same manner as above to find that 57.1% by weight of the added lithium reacted with the manganese oxide. Air was blown into this slurry for 2 hours, and the slurry was again subjected to hydrothermal treatment at 130° C. for 2 hours to obtain a slurry of a lithium manganate precursor (sample a) by batch-wise process. After the slurry was cooled to 80° C., the alkali concentration was measured in the same manner as above to find that 74.1% by weight of the added lithium reacted with the manganese oxide. The molar ratio of Li to Mn in sample a was 0.50.

An X-ray diffraction chart of the sample a is shown in FIG. 1. From FIG. 1, it was recognized that the lithium manganate precursor of sample a was a mixture mainly comprising a solid solution of $2MnO \cdot MnO_2$ and $Li_2O \cdot MnO \cdot MnO_2$, $LiMn_2O_4$, $LiMnO_2$ and the like.

(Synthesis of lithium manganate)

Air was blown into the resulting precursor slurry for 2 hours, followed by filtration. Washing was not carried out. The filter cake was dried at 110° C., and then fired at 500° C. for 3 hours in the air to obtain a lithium manganate (sample A) of the present invention.

Example 2
(Synthesis of manganese hydroxide)

A manganese hydroxide was obtained in the same manner as in Example 1.

(Synthesis of manganese oxide)

A manganese oxide was obtained in the same manner as in Example 1.

(Synthesis of lithium manganate precursor)

The resulting manganese oxide (240 g in terms of Mn) was dispersed in water to prepare a slurry. Pure water and 0.870 liter of lithium hydroxide of 3.206 mols/l in concentration were added to the slurry to obtain 2.40 liters of a liquid. This was charged in a glass reaction vessel of 3 liters and heated to 80° C., and reaction was carried out for 3 hours with blowing air thereinto. The evaporated water was replenished and then a part of the slurry was taken, and alkali concentration thereof was measured to find that 16.4% by weight of the added lithium reacted with the manganese oxide. The slurry was charged in an autoclave and subjected to hydrothermal treatment at 150° C. for 2 hours. The slurry was cooled to 80° C. and then alkali concentration in the slurry was measured in the same manner as above to find that 61.1% by weight of the added lithium reacted with the manganese oxide. Air was blown into this slurry for 2 hours, and the slurry was again subjected to hydrothermal treatment at 150° C. for 2 hours to obtain a slurry of a lithium manganate precursor (sample b) by batch-wise process. After the slurry was cooled to 80° C., the alkali concentration was measured in the same manner as above to find that 78.3% by weight of the added lithium reacted with the manganese oxide. The molar ratio of Li to Mn in the sample b was 0.50.

(Synthesis of lithium manganate)

Air was blown into the resulting precursor slurry for 2 hours, followed by filtration. Washing was not carried out. The filter cake was dried at 110° C., and then fired at 500° C. for 3 hours in the air to obtain a lithium manganate (sample B) of the present invention.

Example 3

(Synthesis of manganese hydroxide)

A manganese hydroxide was obtained in the same manner as in Example 1.

(Synthesis of mangane se oxide)

A manganese oxide was obtained in the same manner as in Example 1.

(Synthesis of lithium manganate precursor)

The resulting manganese oxide (186.5 g in terms of Mn) was dispersed in water to prepare a slurry. Pure water and 0.746 liter of lithium hydroxide of 3.000 mols/l in concentration were added to the slurry to obtain 2.40 liters of a liquid. This was charged in a glass reaction vessel of 3 liters and heated to 80° C., and reaction was carried out for 3 hours with blowing air thereinto. The evaporated water was replenished and then a part of the slurry was taken, and alkali concentration thereof was measured to find that 13.8% by weight of the added lithium reacted with the manganese oxide. The slurry was charged in an autoclave and subjected to hydrothermal treatment at 180° C. for 2 hours. The slurry was cooled to 80° C. and then alkali concentration in the slurry was measured in the same manner as above to find that 55.5% by weight of the added lithium reacted with the manganese oxide. Air was blown into this slurry for 2 hours, and the slurry was again subjected to hydrothermal treatment at 180° C. for 2 hours to obtain a slurry of a lithium manganate precursor (sample c) by batch-wise process. After the slurry was cooled to 80° C., the alkali concentration was measured in the same manner as above to find that 79.1% by weight of the added lithium reacted with the manganese oxide. The molar ratio of Li to Mn in the sample c was 0.52.

(Synthesis of lithium manganate)

Air was blown into the resulting precursor slurry for 2 hours, followed by filtration. Washing was not carried out. The filter cake was dried at 110° C., and then fired at 500° C. for 3 hours in the air to obtain a lithium manganate (sample C) of the present invention.

Example 4

(Synthesis of manganese hydroxide)

A manganese hydroxide was obtained in the same manner as in Example 1.

(Synthesis of manganese oxide)

The resulting slurry containing manganese hydroxide was heated to 60° C., and air was blown thereinto for 1 hour to oxidize the manganese hydroxide in an aqueous medium, followed by aging for 1 hour with blowing nitrogen gas in place of the air and thereafter filtering and washing with water. The resulting filter cake was dried at 200° C. for 12 hours to carry out gas phase oxidation to obtain a manganese oxide. This manganese oxide was large in specific surface area and void content and was mainly composed of $2MnO \cdot MnO_2$.

(Synthesis of lithium manganate precursor)

The resulting manganese oxide (186.5 g in terms of Mn) was dispersed in water to prepare a slurry. Pure water and 0.746 liter of lithium hydroxide of 3.000 mols/l in concentration were added to the slurry to obtain 2.40 liters of a liquid. This was charged in an autoclave and subjected to hydrothermal treatment at 180° C. for 2 hours. The slurry was cooled to 80° C. and a part of the slurry was taken and alkali concentration thereof was measured to find that 31.9% by weight of the added lithium reacted with the manganese oxide. Air was blown into this slurry for 2 hours, and the slurry was again subjected to hydrothermal treatment at 180° C. for 2 hours. The slurry was cooled to 80° C. and alkali concentration thereof was measured in the same manner as above to find that 56.6% by weight of the added lithium reacted with the manganese oxide. Air was blown into this slurry for 2 hours, and the slurry was again subjected to hydrothermal treatment at 180° C. for 2 hours to obtain a slurry of a lithium manganate precursor (sample d) by batch-wise process. After the slurry was cooled to 80° C., the alkali concentration thereof was measured in the same manner as above to find that 75.8% by weight of the added lithium reacted with the manganese oxide. The molar ratio of Li to Mn in sample d was 0.50.

(Synthesis of lithium manganate)

Air was blown into the resulting precursor slurry for 2 hours, followed by filtration. Washing was not carried out. The filter cake was dried at 50° C., and a part thereof was fired at 500° C., 700° C. or 800° C. for 3 hours in the air to obtain lithium manganates (samples D, E and F) of the present invention.

Example 5

(Synthesis of manganese hydroxide)

1146 g of manganese chloride tetrahydrate (99% by weight as $MnCl_2 \cdot 4H_2O$) was dissolved in water to prepare 7.153 liters of a solution. This aqueous manganese chloride solution was charged in a glass reaction vessel of 10 liters, and, with stirring, 1.847 liters of sodium hydroxide of 6.209 mols/l in concentration was added to and dispersed in the aqueous solution over a period of 1 hour in a nitrogen atmosphere with keeping the temperature at 15±5° C. to obtain a manganese hydroxide.

(Synthesis of manganese oxide)

The resulting slurry containing manganese hydroxide was heated to 60° C., and air was blown thereinto for 7 hours to oxidize the manganese hydroxide in an aqueous medium, followed by filtration, washing with water and re-pulping to obtain a slurry of manganese oxide. This manganese oxide had a large specific surface area and a high void content and was mainly composed of $2MnO \cdot MnO_2$.

(Synthesis of lithium manganate precursor)

To the resulting manganese oxide slurry (186.5 g in terms of Mn) were added pure water and 0.746 liter of lithium hydroxide of 3.000 mols/l in concentration to obtain 2.40 liters of a liquid. This was charged in a glass reaction vessel of 3 liters and heated to 80° C., and reaction was carried out for 3 hours with blowing air thereinto. The evaporated water was replenished and then a part of the slurry was taken and alkali concentration thereof was measured to find that 9.58% by weight of the added lithium reacted with the manganese oxide. The slurry was charged in an autoclave and subjected to hydrothermal treatment at 180° C. for 2 hours. The slurry was cooled to 80° C. and then a part of the slurry was taken and alkali concentration of the slurry was measured to find that 64.6% by weight of the added lithium reacted with the manganese oxide. Air was blown into this slurry for 2 hours, and the slurry was again subjected to hydrothermal treatment at 180° C. for 2 hours to obtain a slurry of a lithium manganate precursor (sample g) by batch-wise process. After the slurry was cooled to 80° C., the alkali concentration was measured in the same manner as above to find that 75.8% by weight of the added lithium reacted with the manganese oxide. The molar ratio of Li to Mn in sample g was 0.50.

(Synthesis of lithium manganate)

Air was blown into the resulting precursor slurry for 2 hours, followed by filtration. Washing was not carried out. The filter cake was dried at 50° C., and then fired at 500° C. for 3 hours in the air to obtain a lithium manganate (sample G) of the present invention.

Example 6

(Synthesis of manganese hydroxide)

A manganese hydroxide was obtained in the same manner as in Example 1.

(Synthesis of manganese oxide)

A manganese oxide was obtained in the same manner as in Example 1.

(Synthesis of lithium manganate precursor)

0.304 liter of lithium hydroxide of 3.000 mols/l in concentration was added to the resulting manganese oxide (100 g in terms of Mn), followed by thoroughly mixing them with stirring. Then, the mixture was evaporated to dryness at 110° C. to obtain a lithium manganate precursor (sample h).

(Synthesis of lithium manganate)

The sample h was finely ground using a small-sized grinder and then fired at 750° C. for 3 hours in the air to obtain a lithium manganate (sample H) of the present invention.

Example 7

(Synthesis of manganese hydroxide)

A manganese hydroxide was obtained in the same manner as in Example 1.

(Synthesis of manganese oxide)

A manganese oxide was obtained in the same manner as in Example 1.

(Synthesis of lithium manganate precursor)

The resulting manganese oxide (324 g in terms of Mn) was dispersed in water to prepare a slurry. Pure water and 0.966 liter of lithium hydroxide solution of 3.655 mols/l in concentration were added to the slurry to obtain 2.40 liters of a liquid. This was charged in a glass reaction vessel of 3 liters, and reaction was carried out for 13 hours with heating to 90° C., and with blowing 1 liter/min of oxygen gas thereinto to obtain a lithium manganate precursor (sample i).

The evaporated water was replenished and then a part of the slurry was taken and alkali concentration thereof was measured to find that 89.4% by weight of the added lithium reacted with the manganese oxide. The molar ratio of Li to Mn in the sample i was 0.54.

(Synthesis of lithium manganate)

The resulting precursor slurry was filtered. Washing was not carried out. The filter cake was dried at 110° C., and then fired at 750° C. for 3 hours in the air to obtain a lithium manganate (sample I) of the present invention.

Example 8

(Synthesis of manganese hydroxide)

A manganese hydroxide was obtained in the same manner as in Example 1.

(Synthesis of manganese oxide)

The resulting slurry containing manganese hydroxide was heated to 60° C. This slurry had a pH of 8.3. The manganese hydroxide was oxidized in the slurry with blowing 2 liters/min of oxygen gas into the slurry until pH reached 6. Successively, with blowing oxygen gas into the slurry, a sodium hydroxide solution of 2 mols/liter in concentration was added to adjust the pH to 9, followed by heating to 90° C., aging for 2 hours with keeping the pH at 9, filtrating and washing with water. The resulting filter cake was dispersed in pure water to obtain a slurry of 100 g/l in concentration in terms of Mn. This slurry had a pH of 10.7. With stirring, an aqueous hydrochloric acid solution of 1 mol/l in concentration was added to and dispersed in the slurry at room temperature to adjust the pH to 6. With keeping the pH at 6, reaction was carried out for 3 hours, followed by filtration, washing with water and drying at 70° C. for 15 hours in the air to obtain a manganese oxide. This manganese oxide had a large specific surface area and a high void content and was mainly composed of $2MnO \cdot MnO_2$.

(Synthesis of lithium manganate precursor)

The resulting manganese oxide (312 g in terms of Mn) was dispersed in water to prepare a slurry. Pure water and 0.877 liter of lithium hydroxide solution of 3.655 mols/l in concentration were added to the slurry to obtain 2.40 liters of a liquid. This was charged in a glass reaction vessel of 3 liters, and reaction was carried out for 6 hours with heating to 90° C., and with blowing 1 liter/min of oxygen gas thereinto to obtain a lithium manganate precursor (sample j). The evaporated water was replenished and then a part of the slurry was taken and alkali concentration thereof was measured to find that 89.8% by weight of the added lithium reacted with the manganese oxide. The molar ratio of Li to Mn in the sample j was 0.51.

(Synthesis of lithium manganate)

The resulting precursor slurry was filtered. Washing was not carried out. The filter cake was dried at 110° C., and then fired at 750° C. for 3 hours in the air to obtain a lithium manganate (sample J) of the present invention.

Example 9

(Synthesis of manganese hydroxide)

815 g of manganese sulfate (86% by weight as $MnSO_4$) was dissolved in water to prepare 6.179 liters of a solution. This aqueous manganese sulfate solution was charged in a glass reaction vessel of 10 liters, and, with stirring, the solution was heated to 60° C. in a nitrogen atmosphere. With keeping 60° C., 2.321 liters of sodium hydroxide of 4 mols/l in concentration was added to and dispersed in the aqueous solution over a period of 1 hour to obtain a manganese hydroxide.

(Synthesis of manganese oxide)

The resulting slurry containing manganese hydroxide had a pH of 8.3. With blowing 2 liters/min of oxygen gas into the slurry, the manganese hydroxide was oxidized in the slurry until pH reached 6, followed by filtration and washing with water. The resulting filter cake was dispersed in pure water to prepare a slurry of 100 g/l in terms of Mn, which was charged in a glass reaction vessel of 5 liters and heated to 60° C. 1.329 liters of aqueous hydrochloric acid solution of 1 mol/l in concentration was added to and dispersed in the slurry, and, thereafter, reaction was carried out for 3 hours to replace a part of $Mn^{2+}$ contained in the produced $2MnO \cdot MnO_2$ with proton, followed by filtration and washing with water. By the acid treatment, color of the slurry changed from light brown to blackish brown. The slurry after completion of the reaction had a pH of 4.6.

(Synthesis of lithium manganate precursor)

The resulting manganese oxide (312 g in terms of Mn) was dispersed in water to prepare a slurry. To this slurry were added pure water and 0.841 liter of lithium hydroxide solution of 3.655 mols/l in concentration to obtain 2.40 liters of a liquid. This was charged in a glass reaction vessel of 3 liters, and reaction was carried out for 1 hour with heating to 90° C. and with blowing 1 liter/min of oxygen gas thereinto. The evaporated water was replenished and then a part of the slurry was taken and alkali concentration thereof was measured to find that 55.6% by weight of the added lithium reacted with the manganese oxide. The slurry was charged in an autoclave and subjected to hydrothermal treatment at 130° C. for 3 hours. The slurry was cooled to 90° C. and then alkali concentration of the slurry was measured in the same manner as above to find that 76.9% by weight of the added lithium reacted with the manganese oxide. With blowing 1 liter/min of oxygen gas into this slurry, reaction was carried out at 90° C. for 2 hours to obtain a lithium manganate precursor (sample k). In the same manner as above, the alkali concentration of the slurry was measured to find that 93.7% by weight of the added lithium reacted with the manganese oxide. The molar ratio of Li to Mn in sample k was 0.51.

(Synthesis of lithium manganate)

The resulting precursor slurry was filtered. Washing was not carried out. The filter cake was dried at 110° C., and then fired at 750° C. for 3 hours in the air to obtain a lithium manganate (sample K) of the present invention.

Comparative Example 1

(Synthesis of lithium manganate)

50 g of reagent grade manganese dioxide (95% by weight as $MnO_2$; manufactured by Kanto Kagaku Co., Ltd.) was mixed with lithium hydroxide monohydrate at a molar ratio of Li/Mn of 0.505. The mixture was thoroughly mixed and ground by a small-sized grinder, and then charged in an alumina crucible and fired at 750° C. for 3 hours in the air to obtain a lithium manganate (sample L) of a comparative sample.

Comparative Example 2

(Synthesis of manganese hydroxide)

A manganese hydroxide was obtained in the same manner as in Example 1.

(Synthesis of manganese oxide)

A manganese oxide was obtained in the same manner as in Example 1.

(Synthesis of lithium manganate)

The resulting manganese oxide (50 g in terms of Mn) was mixed with lithium hydroxide monohydrate at a molar ratio of Li/Mn of 0.505. The mixture was thoroughly mixed and ground by a small-sized grinder, and then charged in an alumina crucible and fired at 750° C. for 3 hours in the air to obtain a lithium manganate (sample M) of a comparative sample.

Figure 2:
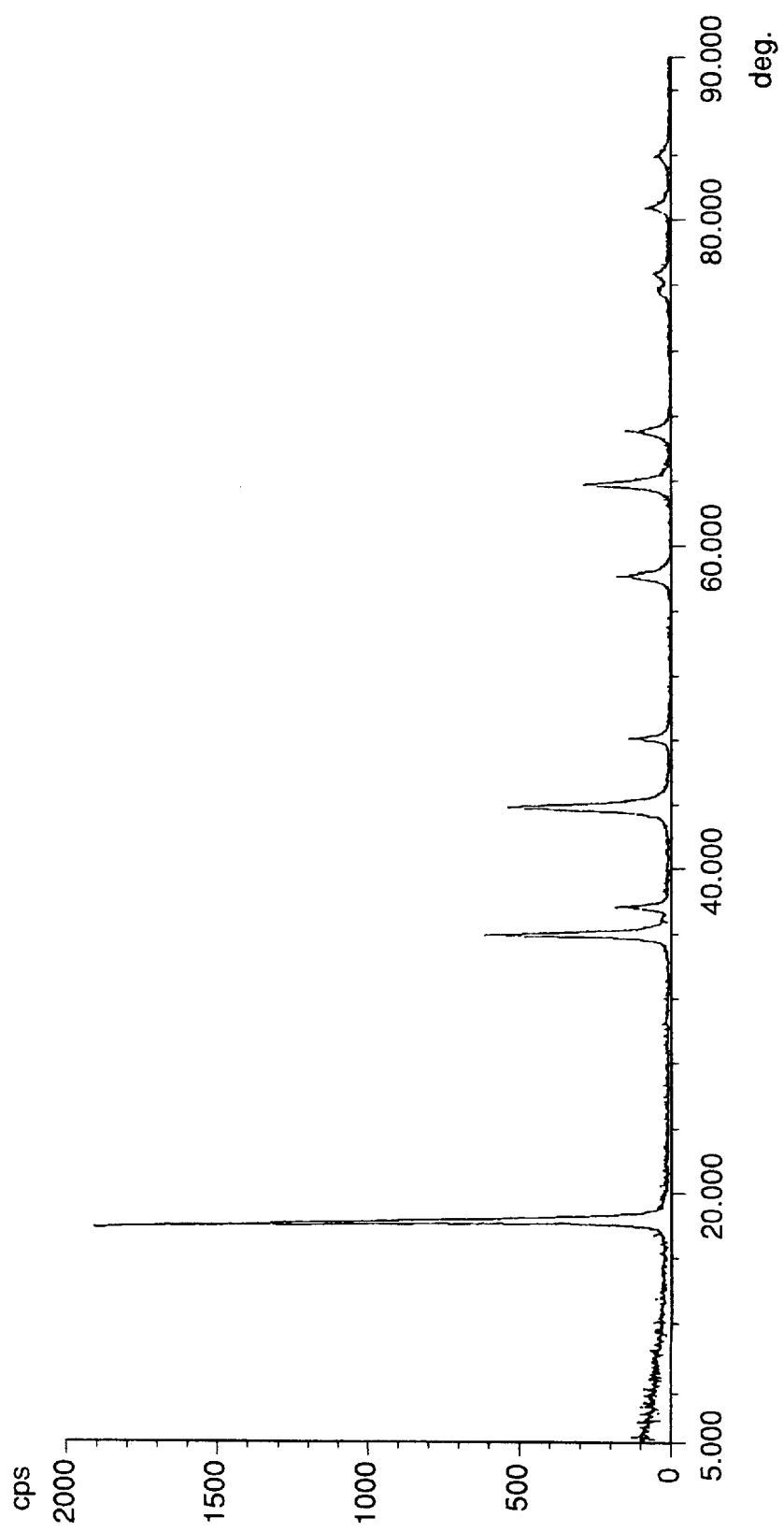
FIG. 2 is an X-ray diffraction chart of sample A.
Figure 3:
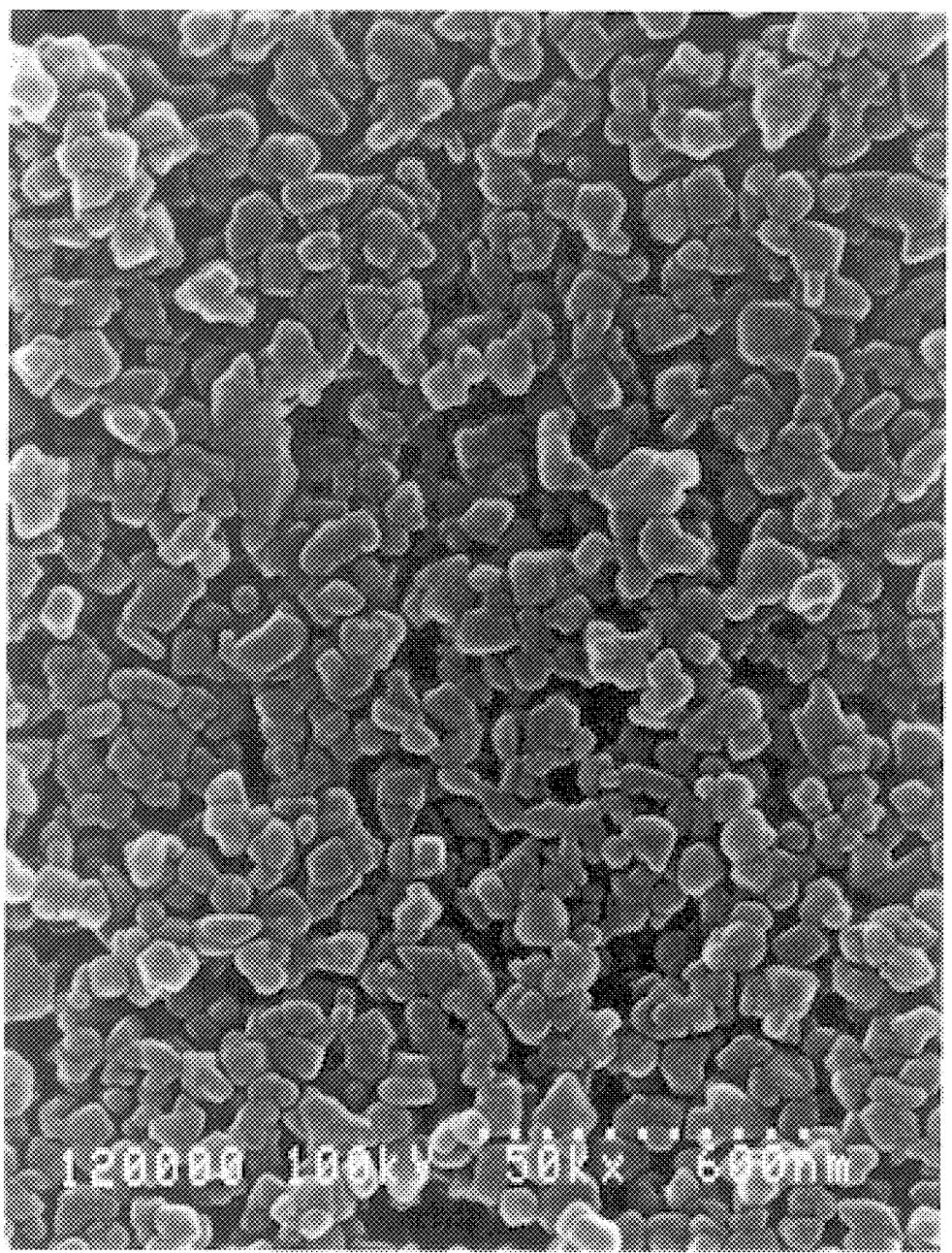
FIG. 3 is a scanning electron microphotograph (50,000× magnification) showing the particle structure of sample A.
Figure 4:
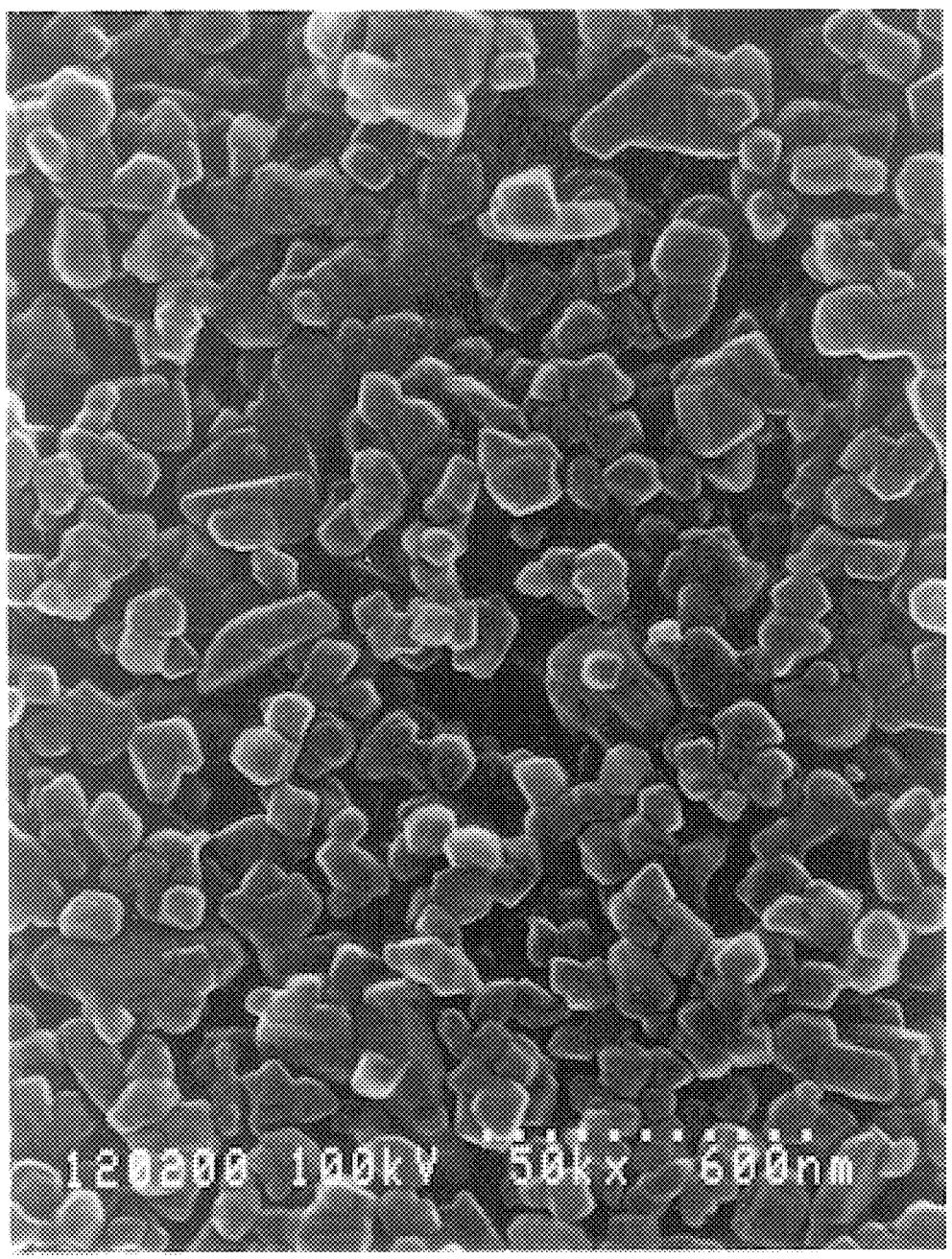
FIG. 4 is a scanning electron microphotograph (50,000× magnification) showing the particle structure of sample C.
Figure 5:
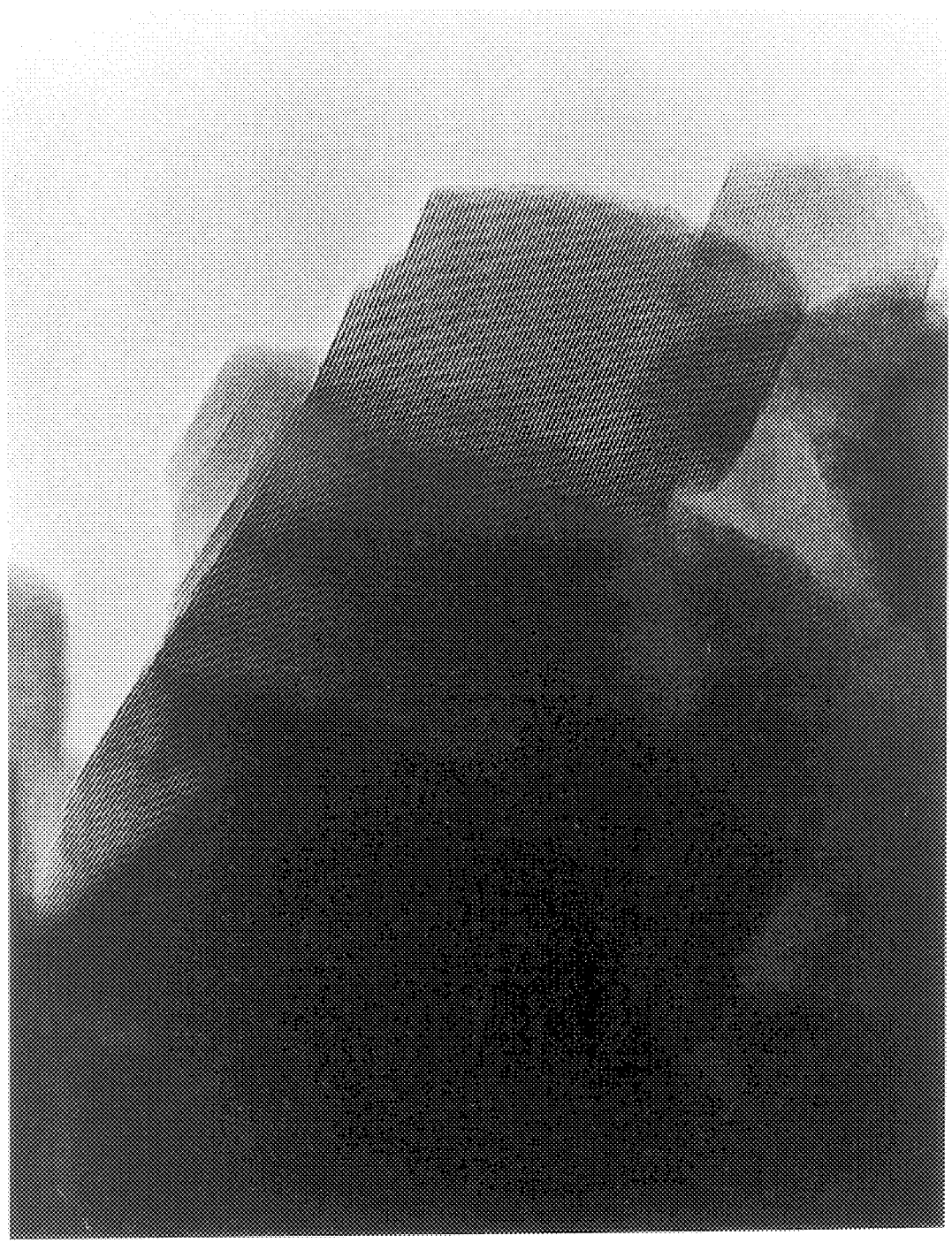
FIG. 5 is a transmission electron microphotograph (1,500,000×magnification) showing the particle structure of sample A.
Figure 6:
FIG. 6 is an electron diffraction photograph of sample A.
Figure 7:
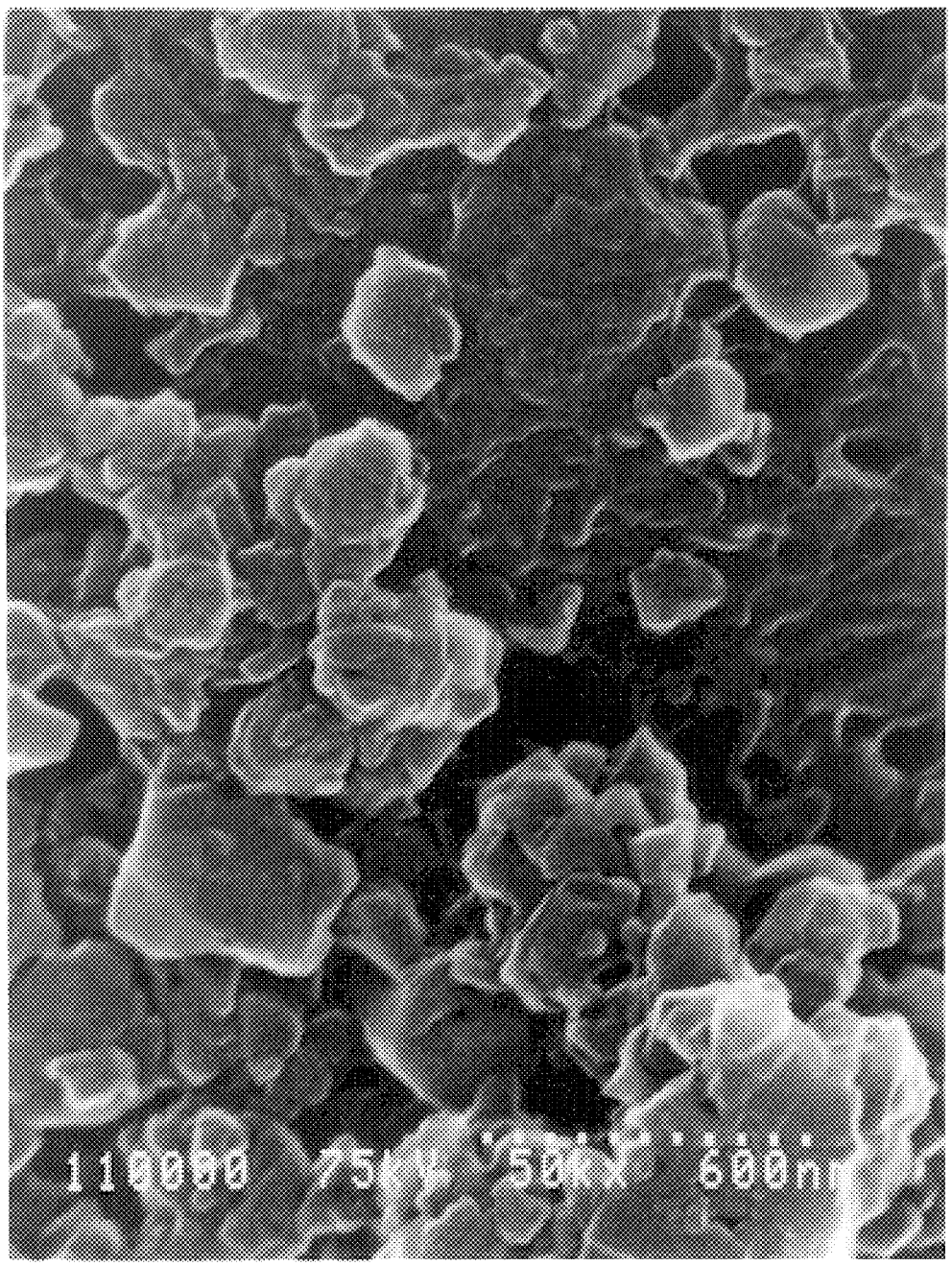
FIG. 7 is a scanning electron microphotograph (50,000× magnification) showing the particle structure of sample L.

Properties of the resulting samples A–M were measured and are shown in Table 1. It was confirmed by observation with an electron microscope that particle form of the lithium manganates of the present invention was cubic. (As examples, scanning electron microphotographs of samples A and C are shown in FIGS. 3 and 4.) The samples partially contained amorphous particles, but amount of the amorphous particles was slight. On the other hand, the comparative sample M contained partially cubic particles, but the proportion of amorphous particles in this sample was very high as in the comparative sample L. Furthermore, the lithium manganates of the present invention were recognized to be excellent in crystallinity in view of the results that a spot-like diffraction pattern was obtained in electron diffraction (as an example, an electron diffraction photograph of sample A is shown in FIG. 6), that a single lattice image was shown in observation by an ultra-high magnification transmission type electron microscope (transmission electron microphotograph of sample A is shown in FIG. 5 as an example), and that the lithium manganates had a single composition of $LiMn_2O_4$ as a result of X-ray diffraction (X-ray diffraction chart of sample A is shown in FIG. 2 as an example).

Furthermore, measurement of specific surface area by BET method and that of void content by nitrogen adsorption were conducted. BELLSOAP-28 manufactured by Japan Bell Co., Ltd. was used for the measurement of the void content. The results of measurements are shown in Table 1. It can be seen from Table 1 that samples A–K had satisfactory specific surface area and had voids in the particles.

Next, charge and discharge characteristics and cycle characteristics of lithium secondary batteries using samples A–M as active materials of positive electrodes were evaluated. The batteries were of triple-electrode cells, and charge and discharge were repeated.

The batteries and measuring conditions will be explained.

Each of the samples, a graphite powder as a conductive agent and polytetrafluoroethylene resin as a binder were mixed at a ratio of 3:2:1, and the mixture was kneaded in an agate mortar. The kneaded product was molded into circular form of 14 mm in diameter to obtain a pellet. Weight of the pellet was 50 mg. This was put between meshes made of metallic titanium, followed by pressing under a pressure of 150 kg/cm² to obtain a positive electrode.

Separately, metallic lithium of 0.5 mm thick was molded into circular form of 14 mm in diameter, and this was put between meshes made of metallic nickel, followed by press-bonding to obtain a negative electrode. Furthermore, a metallic lithium foil of 0.1 mm thick was wound around a metallic nickel wire so that the foil was in a size of a grain of rice, thereby to obtain a reference electrode. As a non-aqueous electrolyte, there was used a mixed solution of 1,2-dimethoxyethane and propylene carbonate (1:1 in volume ratio) in which lithium perchlorate was dissolved at a concentration of 1 mol/l. The electrodes were arranged in the order of positive electrode, reference electrode and negative electrode, and a porous polypropylene film was put between them as a separator.

The measurement of charge and discharge cycle was carried out at a constant current setting the voltage range at 4.3 V to 3.5 V and the charge and discharge current at 0.26 mA (about 1 cycle/day). The initial discharge capacity, the discharge capacity at 10th cycle and the capacity retention rate at that time are shown in Table 1. The capacity was per 1 g of the active material of positive electrode.

TABLE 1

Initial discharge capacity and cycle characteristics of batteries using the lithium manganate as active material of positive electrode

| Sample | Particle diameter ($\mu$m) | Particle form | Specific surface area ($m^2$/g) | Void content (ml/g) | Initial discharge capacity (mAh/g) | Discharge capacity at 10th cycle (mAh/g) | Capacity retention rate (%) |
|---|---|---|---|---|---|---|---|
| A | 0.08 ~ 0.1 | Cubic | 20.0 | 0.140 | 117.0 | 114.3 | 97.7 |
| B | 0.08 ~ 0.2 | Cubic | 16.5 | 0.106 | 123.5 | 118.0 | 95.5 |
| C | 0.1 ~ 0.2 | Cubic | 10.6 | 0.069 | 118.9 | 114.0 | 95.9 |
| D | 0.1 ~ 0.2 | Cubic | 10.3 | 0.085 | 111.8 | 107.8 | 96.4 |
| E | 0.1 ~ 0.6 | Cubic + Amorphous | 4.1 | 0.018 | 124.0 | 113.8 | 91.8 |
| F | 0.5 ~ 0.6 | Cubic + Amorphous | 1.7 | 0.010 | 123.0 | 110.6 | 90.0 |
| G | 0.1 ~ 0.2 | Cubic | 12.3 | 0.083 | 120.3 | 114.8 | 95.4 |
| H | 0.1 ~ 0.25 | Cubic + Amorphous | 3.9 | 0.025 | 126.6 | 120.7 | 95.3 |
| I | 0.2 ~ 0.6 | Cubic + Amorphous | 3.6 | 0.010 | 117.1 | 115.2 | 98.4 |
| J | 0.2 ~ 0.4 | Cubic | 6.0 | 0.014 | 130.6 | 126.8 | 96.8 |
| K | 0.4 ~ 0.5 | Cubic | 3.5 | 0.010 | 130.2 | 124.6 | 95.7 |
| L | 0.1~ | Amorphous | 1.5 | 0.007 | 91.4 | 87.2 | 95.4 |
| M | 0.2 ~ 0.4 | Cubic + Amorphous | 2.8 | 0.006 | 68.2 | 66.0 | 96.9 |

As shown in Table 1, the lithium manganates of the present invention showed a high initial discharge capacity of at least 95 mAh/g and, besides, provided excellent cycle characteristics.

Lithium manganate prepared by the conventional dry process was apt to have defects in crystal structure, which cause deterioration of crystallinity with repetition of charge and discharge, resulting in decrease of cycle capacity.

Moreover, lithium manganate is smaller in diffusion coefficient of lithium ion as compared with lithium cobaltate having a layered rock salt structure which has been practically used as active material for positive electrode of lithium ion secondary batteries. On the other hand, the lithium manganate of the present invention has cubic particle form and contains voids in the particles, and thus is excellent in crystallinity. That is, it has conditions advantageous for insertion of lithium, and, hence, is preferred for attaining improvement of current density.

INDUSTRIAL APPLICABILITY

The lithium manganate of the present invention has a cubic particle form and contains voids in the particles, and, therefore, lithium batteries using it as a positive electrode material show a high initial discharge capacity and furthermore are excellent in cycle characteristics. In addition, the production process of the present invention is a process according to which lithium manganates having the above features can be advantageously produced.

What is claimed is:

1. A process for producing a lithium manganate which includes a step of reacting a manganese compound with an alkali to obtain a manganese hydroxide, a step of oxidizing the manganese hydroxide in an aqueous medium or a gaseous phase to obtain a manganese oxide, a step of reacting the manganese oxide with a lithium compound in an aqueous medium to obtain a lithium manganate precursor, and a step of firing the precursor to obtain a lithium manganate.

2. A process according to claim 1, wherein the manganese oxide and the lithium compound are subjected to hydro-thermal treatment in an aqueous medium in the step of reacting the manganese oxide with a lithium compound in an aqueous medium to obtain a lithium manganate precursor.

3. A process according to claim 1, wherein an oxidizing agent is fed into a reactor in batch-wise or continuous manner in the step of reacting the manganese oxide with a lithium compound in an aqueous medium to obtain a lithium manganate precursor.

4. A process according to claim 1 wherein the reaction of manganese oxide with a lithium compound in an aqueous medium to obtain a lithium manganate precursor occurs at a temperature of 50° C. or higher.

5. A process for producing a lithium manganate which includes a step of reacting a manganese compound with an alkali to obtain a manganese hydroxide, a step of oxidizing the manganese hydroxide in an aqueous medium or a gaseous phase to obtain a manganese oxide, a step of reacting the manganese oxide with an acid in an aqueous medium to obtain a proton-substituted manganese oxide, a step of reacting the proton-substituted manganese oxide with a lithium compound in an aqueous medium to obtain a lithium manganate precursor, and a step of firing the precursor to obtain a lithium manganate.

6. A process according to claim 5, wherein the acid is at least one acid selected from hydrochloric acid, sulfuric acid, nitric acid and hydrofluoric acid.

7. A process according to claim 1 or 5, wherein the manganese compound is a water-soluble manganese compound.

8. A process according to claim 5, wherein the manganese oxide or the proton-substituted manganese oxide and the lithium compound are subjected to hydro-thermal treatment in an aqueous medium in the step of reacting the proton-substituted manganese oxide with a lithium compound in an aqueous medium to obtain a lithium manganate precursor.

9. A process according to claim 1 or 5, wherein the lithium compound is lithium hydroxide.

10. A process according to claim 5, wherein an oxidizing agent is fed into a reactor in batch-wise or continuous manner in the step of reacting the proton-substituted manganese oxide with a lithium compound in an aqueous medium to obtain a lithium manganate precursor.

11. A process according to claim 10, wherein the oxidizing agent is at least one agent selected from air, oxygen, ozone, aqueous hydrogen peroxide and peroxodisulfate.

12. A process according to claim 5 wherein the reaction of the proton-substituted manganese oxide with a lithium compound in an aqueous medium to obtain a lithium manganate precursor occurs at a temperature of 50° C. or higher.

13. A process according to claim 1 or claim 5, wherein the produced lithium manganate is employed in the production of a positive electrode.

14. A process according to claim 1 or claim 5, wherein the produced lithium manganate is employed in the production of a lithium battery.

* * * * *